United States Patent [19]

Sigmon

[11] 4,215,722
[45] Aug. 5, 1980

[54] ROTARY FLOW REGULATING VALVE AND METHOD

[76] Inventor: James W. Sigmon, 2415 Knollwood Rd., Charlotte, N.C.

[21] Appl. No.: 686,003

[22] Filed: May 13, 1976

[51] Int. Cl.² .............................................. F16K 5/00
[52] U.S. Cl. ................................. 137/625.3; 251/159; 251/171; 251/172
[58] Field of Search ........................ 137/625.3, 625.31; 251/159, 171, 172

[56] References Cited

U.S. PATENT DOCUMENTS

| 3,007,490 | 11/1961 | Passmore | 251/159 X |
| 3,062,238 | 11/1962 | Boyd | 251/172 X |
| 3,580,539 | 5/1971 | Van Scoy | 251/172 X |
| 3,901,474 | 8/1975 | Kubota | 251/159 |

FOREIGN PATENT DOCUMENTS 674771  7/1952  United Kingdom ..................... 251/159

*Primary Examiner*—Harold W. Weakley
*Attorney, Agent, or Firm*—Bell, Seltzer, Park & Gibson

[57] ABSTRACT

A rotary flow regulating valve in which a cylindrical expansible bellows mounted in the valve body and encircling a conduit therethrough moves a circular seal means between engagement with a spherical sealing surface of a valve member and a position withdrawn from the sealing surface. The valve body and valve member cooperate in defining a circumferential flow path between the sealing surface and the valve body and a diametrical flow path through the valve member. With the bellows vented to withdraw the seal means from the sealing surface, the valve member is rotated to regulate fluid flow through the valve while dividing fluid flow between the circumferential and diametrical flow paths and continue fluid flow over the sealing surface to thereby distribute wear and maintain sealing efficiency.

7 Claims, 9 Drawing Figures

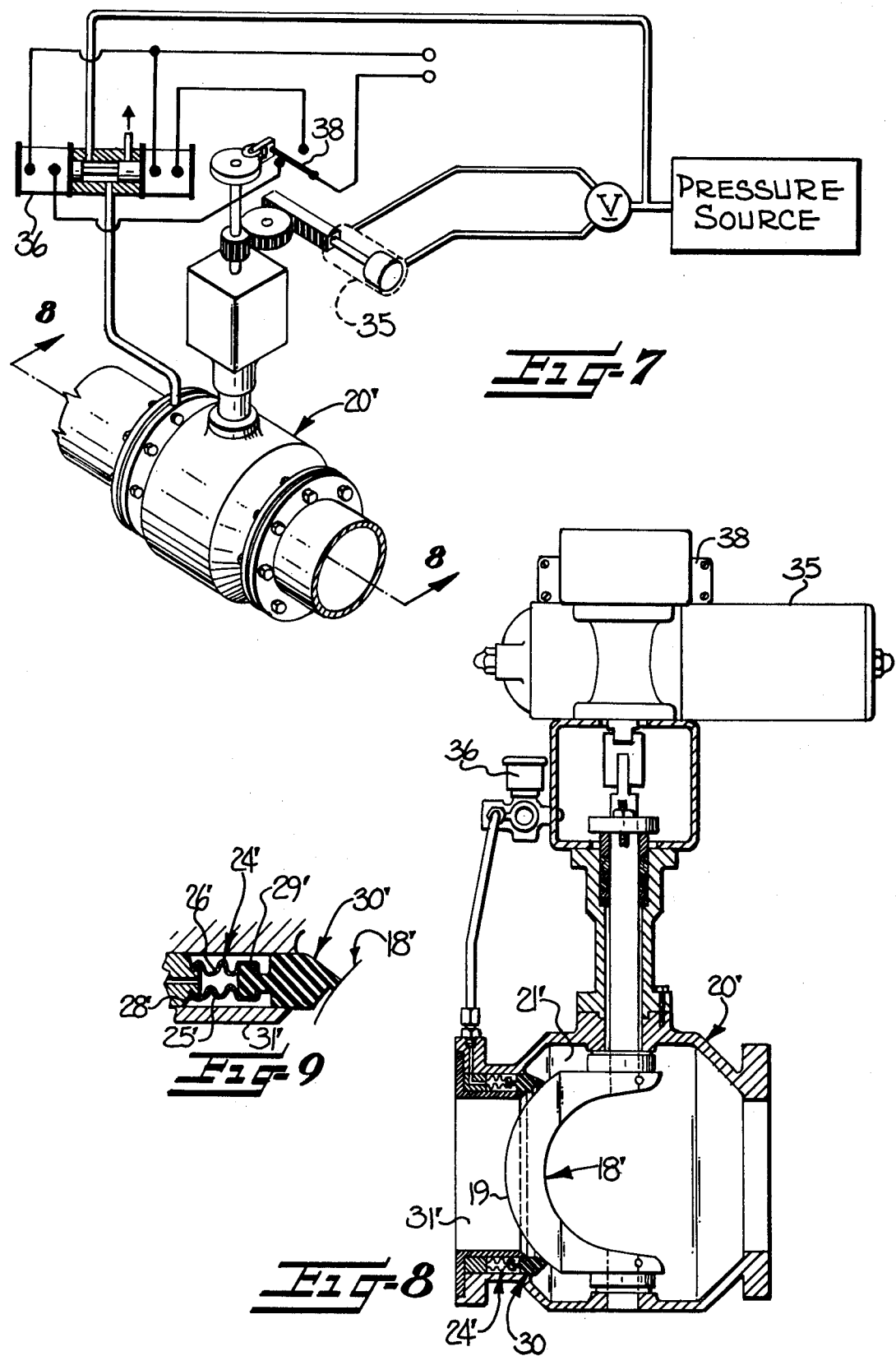

ROTARY FLOW REGULATING VALVE AND METHOD

This application is entitled to the benefit of earlier filing dates under 35 USC 120 and 121 and reference is made to copending application Ser. No. 552,412 filed Feb. 24, 1975 and its copending application Ser. No. 404,868, filed Nov. 10, 1973.

This invention relates to a flow regulating valve and, more particularly, to a rotary valve having a valve member with a spherical sealing surface. Flow regulating valves heretofore have been substantially only reciprocating and have been contrasted with flow blocking valves. Previously known flow regulating valves present a greater resistance to flow than do flow blocking valves, and flow through such a valve is proportional to the separation between sealing surfaces of a valve member and a seat which receives the valve member. The primary example of prior flow regulating valves has been the globe valve, in which a disc or plug is moved relative to a seat. Such substantially infinitely variable positioning provides for distribution of fluid flow over all sealing surfaces of the seat and valve member, thereby distributing the wear which occurs. Such flow regulating valves are installed whereever the greater resistance to flow is acceptable, where the volume of flow is to be modulated in response to a controller, or where valves are to be operated frequently.

Flow blocking valves have heretofore been either rotary or reciprocating in type, with examples being gate, plug and ball valves. The recognized substantial identity between gate and ball valves is shown, by way of example, by the definitions provided in the Concise Chemical and Technical Dictionary, Second Edition (H. Bennet, Editor; Chemical Publishing Company) and the Chemical Engineers Handbook (McGraw-Hill), and the disclosures of such prior patents as Boyd U.S. Pat. No. 3,062,238, Reaves U.S. Pat. No. 3,610,569 and Grove et al U.S. Pat. No. 3,790,123. Such valves are two position valves, being movable between flow blocking and flow permitting positions, and are not otherwise usable due to "wire draw" wear. Such "wire draw" wear arises due to the flow characteristics of fluid passing through flow blocking valves. Such valves have relatively low flow resistance and thus flow through the valve is always substantially full flow. When such a valve is "cracked" or barely opened, high velocity flow across the sealing surfaces occurs at some point with such high velocity flow, cavitation and the like eroding the sealing surface at a relative limited area. Continuation of such flow erodes a relatively narrow wear path through the valve member and ultimately results in failure of the valve to perform its intended flow blocking function. For these reasons, flow blocking valves are used in locations not requiring modulation or movement to valve positions intermediate the flow blocking and full flow positions.

With the foregoing in mind, it is an object of the present invention to distribute fluid flow through a rotary flow regulating valve having a valve member with a spherical sealing surface in such a manner as to avoid "wire draw" wear and maintain an even distribution of any erosion which may occur. In accomplishing this object of the present invention, a rotary flow regulating valve is adapted to throttling or flow regulating use while avoiding the difficulties and deficiencies heretofore encountered. The distribution of fluid flow is accomplished by providing a circular seal which may be subjected to hoop stress on sealing engagement with the spherical sealing surface and providing means for moving the seal member to a position withdrawn from the valve member. Further, the present invention contemplates that the valve member and a valve body enclosing the member define a circumferential flow path in which fluid flows over the sealing surface and a diametrical flow path through the valve member, with the ratio of fluid flow division between the two paths accomplishing the desired throttling, modulation or regulation of fluid flow.

A further object of this invention is to provide for sealing engagement between a seal member and a spherical sealing surface through imposition of hoop stress on the seal member, while assuring distribution of fluid flow erosion wear over both the sealing surface and the seal member in such a manner as to maintain sealing efficiency even during use of the valve in the regulation of flow. In realizing this object of the present invention, a circular seal member is withdrawn from sealing engagement with a sealing surface, and fluid flow is divided between a circumferential path in which the seal member is exposed and which passes over the sealing surface and a diametrical path which fluid passes within the sealing surface. The seal member is returned to sealing engagement with the sealing surface only upon a valve member which bears the surface occupying one of flow blocking and full flow positions, with the valve being modulated intermediate those positions for regulating fluid flow.

Some of the objects of the invention having been stated, other objects will appear as the description proceeds, when taken in connection with the accompanying drawings, in which:

FIG. 7 is a perspective view of a rotary flow regulating valve in accordance with this invention as installed for use;

FIG. 8 is a vertical section through the valve of FIG. 7, taken generally along the line 8—8 in that figure; and FIG. 9 is an enlarged sectional view showing a bellows means used in the valves of FIGS. 4 through 8.

While this invention will be described hereinafter with particular reference to the accompanying drawings, it will be understood at the outset that the drawings and description are intended to disclose the best mode contemplated for use of this invention at the time that the drawings and description were prepared and that other modes of use of the invention are considered probable. Accordingly, the drawings and description are not to be taken as limiting upon the present invention, but as an enabling disclosure which may permit persons skilled in the valve arts to adapt this invention to structures and processes not here described in detail.

Figure 1:
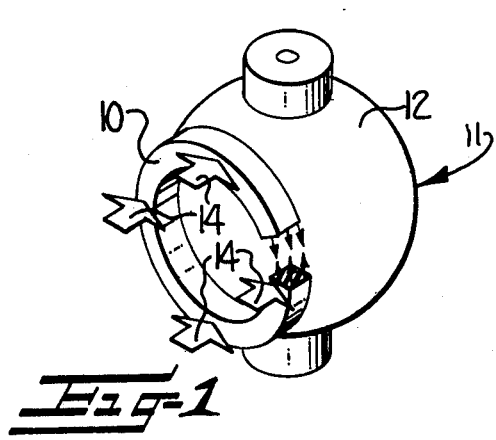
FIG. 1 is a schematic perspective view of a member having a spherical surface and a seal means being subjected to hoop stress as a result of engagement with the spherical surface.

Referring now more particularly to the accompanying drawings, the rotary flow regulating valve of this invention relies upon an interaction of elements which is characteristic of ball valves such as have been known heretofore and other related valves in which spherical sealing surfaces are provided. In accordance with this characteristic, sealing forces between a circular seal member and a spherical sealing surface arise due to hoop stress of the seal member. As schematically illustrated in perspective in FIG. 1, force applied between a circular seal member 10 and a member 11 having a spherical surface 12 (as indicated by arrows 14 in FIG. 1), acting throughout the circumference of the seal member 10 and generally in a direction parallel to a radial line between the center of the circular seal member 10 and the center of the spherical sealing surface attempts to force the circular seal member 10 over the spherical sealing surface. Such action gives rise to forces tending to enlarge the circumference of the seal member 10 by imposing resultant tensile forces circumferentially thereabout. Such tension forces apply stress tending to stretch the "hoop" formed by the seal means 10 and which are therefore identified herein as imposing "hoop stress". As persons familiar with valve structure and operation will recognize, sealing with imposition of hoop stress has heretofore been a characteristic of flow blocking ball valves. In accordance with the present invention, such sealing with imposition of hoop stress is employed in a flow regulating valve wherein distribution of fluid flow erosion assures continuance of the desired seal.

Figure 2:
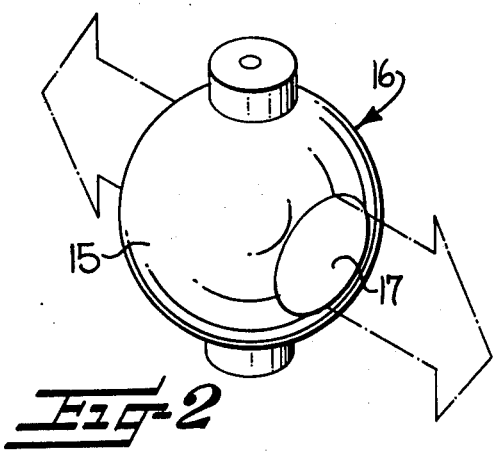
FIG. 2 is a schematic perspective view of a first valve member having a spherical sealing surface.
Figure 3:
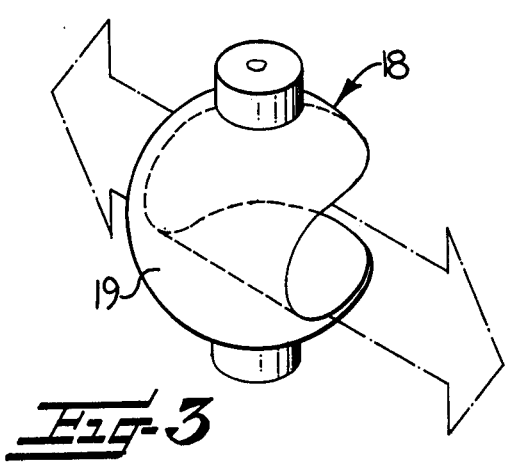
FIG. 3 is a view similar to FIG. 2 of a second valve member having a spherical sealing surface.

Persons familiar with valve structures will also readily recognize that a spherical sealing surface 15 may be provided on a ball member 16 (FIG. 2) having a diametrical passageway therethrough referred to as a waterway 17 or may be provided on a segmented valve member 18 (FIG. 3). The segmented valve member 18 has a part spherical sealing surface 19 on only one side and has been variously identified in prior publications as a ballment, characterized ball or segmented ball member. The present invention contemplates use of valve members of either of these two types in a flow regulating valve as here described.

Figure 4:
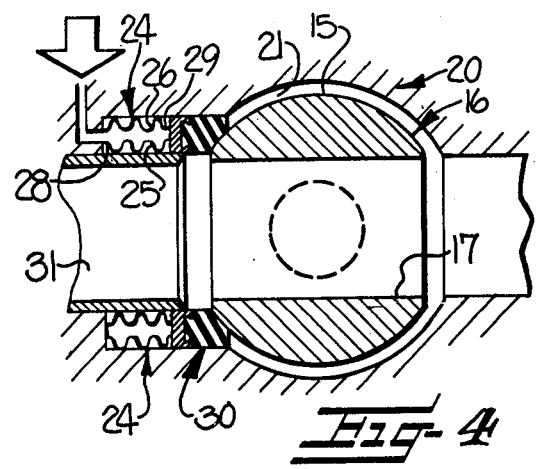
FIG. 4 is a sectional plan view through a rotary flow regulating valve in accordance with the present invention, arranged in a full flow position.
Figure 5:
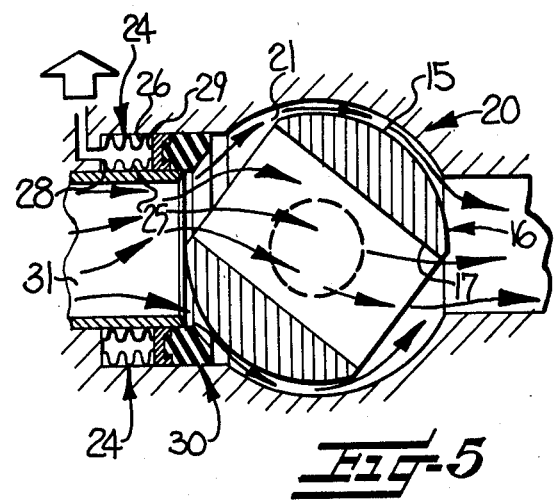
FIG. 5 is a view similar to FIG. 4, with the valve arranged in an intermediate or regulating position.
Figure 6:
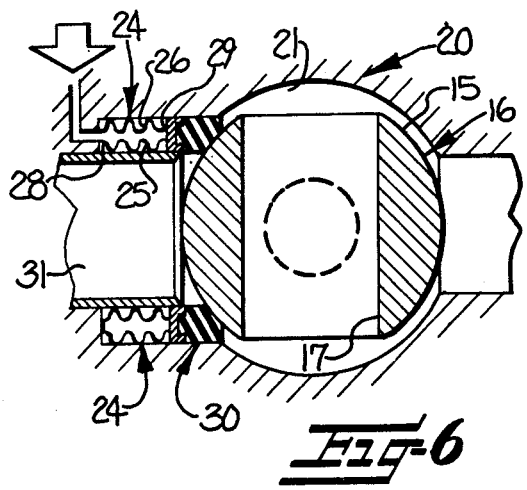
FIG. 6 is a view similar to FIG. 4, with the valve arranged in flow blocking position.

The method of operating the valve of this invention, and certain structural features of the valve, will become more clear from FIGS. 4–6 showing the use of a valve member such as is shown in perspective in FIG. 2. In FIGS. 4–6, the valve member 16 is mounted within a valve body 20 for rotation relative thereto. As is known to persons skilled in the pertinent valve arts, such mounting of the valve member 16 may be accomplished through use of trunion mounting arrangements or through use of floating arrangements which permit a greater degree of movement for the valve member 16. It is significant that, in accordance with this invention, the valve body 20 which encloses the valve member 16 defines therewith a circumferential flow path at 21 extending between the spherical sealing surface 15 of the valve member 16 and the valve body 20. As pointed out hereinabove, the valve member 16 has a waterway 17 therethrough which provides a diametrical flow path.

Mounted in the valve body 20 is a cylindrical expansible bellows means generally indicated at 24. The bellows means 24 comprises circumferentially convoluted inner and outer springy walls 25, 26 and has a first end 28 fixed relative to the valve body 20. The bellows means additionally has a second end 29 movable toward the valve member 16 on expansion of the bellows means. The springy walls 25, 26 of the bellows means normally bias the first and second ends 28, 29 thereof toward one another.

Interposed between the second end 29 of the bellows means 24 and the valve member 16 is a circular seal means 30. As will be brought out more fully hereinafter, the seal means 30 is moved between a position withdrawn from the valve member 16 and a position in engagement with the spherical sealing surface 15 thereof. Preferably, the seal means 30 is mounted on the second end 29 of the bellows means and thereby is biased by the springy walls 25, 26 toward the withdrawn position.

In order to controllably pressurize the bellows means 24 independently of pressure conditions within the conduit by way of which fluid passes through the valve body 20, the bellows means 24 operatively communicates with a pressurizing fluid means. The pressurizing fluid means conducts a suitable fluid, such as compressed air under such suitable pressure as may be readily available, to the bellows means and, on admission of such pressure, controllably urges the second end 29 thereof toward the valve member 16 for imposing hoop stress on the seal means 30 as the seal means is forced into sealing engagement with the sealing surface 15 thereof. The bellows means 24 is indicated as being pressurized in FIG. 4, with the seal means 30 being urged into sealing engagement with the valve member 16 while the valve member is disposed in a full flow position.

The bellows means 24 and seal means 30 encircle a sleeve means in the form of a member 31 disposed in an upstream bore portion of the valve body 20. The sleeve means 31, in addition to facilitating assembly of the valve structure and protecting the bellows means 24, cooperates with the bellows means 24 and seal means 30 in exposing to conduit fluid pressure only surfaces which are parallel to the direction of flow through the valved conduit (FIG. 5). Thus, the sealing force urging the seal means 30 toward the sealing surface 15 is determined solely by the pressurization of the bellows means 24, and not by pressure conditions within the valved conduit as would be the case were the seal means 30 to have a surface perpendicular to flow through the valved conduit exposed to conduit fluid pressure.

When regulation of fluid flow through the valve means is desired, in accordance with this invention, the bellows means 24 is vented or the pressure exerted by the pressurizing fluid on the bellows means is otherwise released and relaxed. With such release of pressure, the springy walls 25, 26 of the bellows means retract the seal means 30 from engagement with the sealing surface of the valve member 16, permitting fluid to flow both through the waterway 17 and through the circumferential flow path 21 (FIG. 5). As will be observed, such flow through the circumferential flow path 21 distributes fluid flow over the entirety of the sealing surface 15, thereby avoiding uneven erosion and wear of that surface in accordance with an important feature of this invention.

While flow is passing both over the circumferential flow path 21 and through the diametrical flow path 17, the quantity of flow may be regulated by rotating the valve member to a desired rotational position relative to the valve body 20. As the valve member 16 is rotated, fluid flow is divided between the circumferential and the diametrical flow paths 21, 17 and the ratio of such division is varied by relative position of the valve member (FIG. 5) while distribution of fluid flow over the sealing surface is maintained. Thus, the rotary flow regulating valve in accordance with this invention possesses the desirable characteristics of reciprocating flow regulating globe valves which have been employed heretofore while additionally realizing the benefit of hoop stress when sealing engagement between the seal means 30 and the sealing surface 22 is required or appropriate.

It is further to be noted that the seal means 30 remains exposed to fluid flow in the circumferential flow path 21 (FIG. 5) even when occupying the withdrawn position. Such exposure of the seal means 30 facilitates uniform distribution of fluid flow wear of the seal means, consistent with the uniform distribution of wear of the sealing surface 15.

As will be understood, movement of the seal means 30 into sealing engagement with any portion of the spherical surface 15 during regulated fluid flow (fluid flow other than blocked or full flow) through the valve of this invention would give rise to an uneven distribution of fluid flow about the sealing surface 15 and an uneven distribution of fluid erosion or wear on that surface and the seal means 30. For this reason, seal means 30 is maintained in the withdrawn position during such regulated flow. However, the present invention contemplates that the seal means 30 will be moved into sealing engagement with the spherical surface 15 when the valve member 16 is in either the full flow position (FIG. 4) or the flow blocking position (FIG. 6) and only when the valve member is in one of such positions. For this reason an interlock is provided between the actuator means by which the valve member 16 is rotated and the pressurizing fluid means.

While the principle of this invention has been described hereinabove with particular reference to the ball member schematically shown in FIGS. 2 and 4-6, it is to be noted that the present invention contemplates the use of a valve member having less than a full spherical surface, such as the valve member 18 of FIG. 3. A practical embodiment of such a valve is shown in FIG. 7, where an actuator means takes the form of a pneumatic motor drive 35 suitably connected to a flow sensing controller or other device for modulating the position of the valve member. An appropriate interlock is provided between the actuator 35 and a pressurizing fluid valve 36, such that the actuator 35 moves the valve member from the flow blocking position as the valve 36 is operated to vent the bellows means. Portions of the valve structure of FIG. 7 corresponding to valve structural elements described hereinabove have been identified by a common reference character, with the addition of prime notation. It is to be noted that the valve member 18' does not provide a spherical sealing surface aligned for proper engagement by the seal means 30' when in the full flow position. For this reason, the interlock permits pressurization of the bellows means 24' only when the valve member 18' is in the flow blocking position.

While herein illustrated with specific reference to a pneumatic motor drive 35 in which a limit switch 38 selectively controls energization of a solenoid operated three way valve 36, it it to be recognized that the use of electrical or manually operated actuator means is contemplated and that persons skilled in the appropriate arts and knowing of this invention can adapt such actuator means to an appropriate interlock. Further, the illustration here of valves for use primarily in a single flow direction, while consistent with the preferred use of flow regulating valves, is to be understood as a teaching sufficient to permit installation of controlled seal means at more than one part or conduit portion of a valve using a member with a spherical sealing surface.

In the drawings and specification, there has been set forth a preferred embodiment of the invention, and although specific terms are employed, they are used in a generic and descriptive sense only and not for purposes of limitation.

That which is claimed is:

1. A rotary flow regulating valve comprising a valve member having a spherical sealing surface; a valve body with a conduit therethrough for operative communication with a fluid flow conduit, said valve body enclosing said valve member for defining therewith a circumferential flow path between said sealing surface and said valve body and a diametrical flow path through said valve member; cylindrical expansible bellows means mounted in said valve body and encircling said conduit therethrough and having a first end fixed stationarily relative to said valve body and a second end movable toward the valve member on expansion of said bellows means; circular seal means encircling said conduit through said valve body and interposed between said second end of said bellows means and said valve member for movement between a position withdrawn from said valve member and a position in sealing engagement therewith; pressurizing fluid means operatively communicating with said bellows means for controllably pressurizing said bellows means independently of pressure conditions within said conduit and thereby for controllably urging said second end thereof toward said valve member and for imposing hoop stress on said seal means upon sealing engagement thereof with said sealing surface; and means for mounting said valve member for rotation within said valve body between a flow blocking position in which said sealing surface is disposed for sealing engagement of said seal means therewith and a full flow position, rotation of said valve member to intermediate rotational positions dividing fluid flow between said circumferential and diametrical flow paths with the ratio of division between said paths being varied by rotation of said valve member to a desired rotational position so as to regulate fluid flow through said body while maintaining distribution of fluid flow over said sealing surface.

2. A rotary fluid regulating valve according to claim 1 wherein said bellows means comprises circumferentially convoluted inner and outer springy walls for biasing said first and second ends of said bellows means toward one another and further wherein said seal means is mounted on said second end of said bellows means and thereby is biased by said walls toward said withdrawn position.

3. A rotary fluid regulating valve according to claim 1 wherein said valve body includes an upstream bore portion and sleeve means disposed in said upstream bore portion adjacent said valve member for defining an upstream portion of said conduit through said body, said bellows means and said seal means encircling said sleeve means and said seal means sealingly engaging said sleeve means and said upstream bore portion for substantially preventing subjection of said bellows means to fluctuation in fluid pressure conditions within said conduit.

4. A rotary fluid regulating valve according to claim 1 wherein said valve body includes an upstream bore portion and sleeve means disposed in said upstream bore portion adjacent said valve member for defining an upstream portion of said conduit through said body, said sleeve means having an inner terminal end spaced from said valve member, and further wherein said seal means when occupying said withdrawn position extends beyond said inner terminal end for exposure to fluid flow in said circumferential flow path so as to facilitate uniform distribution of fluid flow wear of said seal means.

5. A rotary flow regulating valve according to claim 1 wherein said valve member is a ball member having a waterway therethrough.

6. A rotary flow regulating valve according to claim 1 wherein said valve member is a characterized ball member having a part spherical sealing surface.

7. A rotary flow regulating valve according to claim 1 further comprising actuator means for rotating said valve member to a desired rotational position relative to said valve body and interlock means operatively interconnecting said actuator means and said pressurizing fluid means for admitting pressurizing fluid to said bellows means only upon said valve member occupying one of the flow blocking and full flow positions.

* * * * *